US012566825B2

(12) United States Patent
Safronoff et al.

(10) Patent No.: US 12,566,825 B2
(45) Date of Patent: Mar. 3, 2026

(54) SYSTEMS AND METHODS FOR GENERATING CUSTOMIZED TRAINING

(71) Applicant: Capital One Services, LLC, McLean, VA (US)

(72) Inventors: Daniel Vincent Safronoff, Washington, DC (US); Mahsa Chenari, Sterling, VA (US); Jessica Ya, Reston, VA (US)

(73) Assignee: CAPITAL ONE SERVICES, LLC, Mclean, VA (US)

( * ) Notice: Subject to any disclaimer, the term of this patent is extended or adjusted under 35 U.S.C. 154(b) by 1002 days.

(21) Appl. No.: 17/570,410

(22) Filed: Jan. 7, 2022

(65) Prior Publication Data

US 2023/0222184 A1 Jul. 13, 2023

(51) Int. Cl.
| | |
|---|---|
| *G06N 20/20* | (2019.01) |
| *G06F 18/21* | (2023.01) |
| *G06F 18/40* | (2023.01) |
| *G06N 3/08* | (2023.01) |
| *G06Q 10/0639* | (2023.01) |

(52) U.S. Cl.
CPC .......... *G06F 18/40* (2023.01); *G06F 18/2178* (2023.01); *G06N 3/08* (2013.01); *G06N 20/20* (2019.01); *G06Q 10/0639* (2013.01)

(58) Field of Classification Search
CPC ....... G06Q 10/0639; G06N 5/04; G06N 20/00
See application file for complete search history.

(56) References Cited

U.S. PATENT DOCUMENTS

| | | | |
|---|---|---|---|
| 7,533,369 B2 | 5/2009 | Sundararajan et al. | |
| 10,438,156 B2 * | 10/2019 | Swanson .......... | G06Q 10/06398 |
| 11,087,260 B2 * | 8/2021 | Clearwater .......... | G06F 21/552 |
| 2019/0258983 A1 * | 8/2019 | Thomaidou ...... | G06Q 10/06398 |
| 2020/0005928 A1 * | 1/2020 | Daniel ................... | G16H 15/00 |
| 2020/0034774 A1 * | 1/2020 | Swanson .......... | G06Q 10/06398 |
| 2021/0335143 A1 * | 10/2021 | Jenkins ................. | G06V 10/82 |
| 2023/0334608 A1 * | 10/2023 | Sansone ............... | G06Q 30/06 |
| 2024/0412145 A1 * | 12/2024 | Wheeler .......... | G06Q 10/06398 |
| 2024/0412313 A1 * | 12/2024 | Wheeler ............... | G06N 20/00 |

FOREIGN PATENT DOCUMENTS

| | | | | |
|---|---|---|---|---|
| CN | 109656529 B | | 5/2021 | |
| CN | 115688899 A | * | 2/2023 | ............. G06N 3/063 |
| CN | 115878868 A | * | 3/2023 | ........... A63B 1/0622 |
| WO | WO-2022087733 A1 | * | 5/2022 | ............... G09B 5/00 |

* cited by examiner

*Primary Examiner* — Dylan C White

(74) *Attorney, Agent, or Firm* — TROUTMAN PEPPER LOCKE LLP; Christopher J. Forstner; John A. Morrissett

(57) ABSTRACT

A system may be configured to perform a method for generating customized training. The system may receive first user interaction data associated with a user. The system may determine, using a machine learning model (MLM), whether the first user interaction data exceeds a predetermined threshold. Based on such determination, the system may assign a training module to the user. The system may access a user profile associated with the user, the user profile comprising a plurality of training modules. The system may generate a training plan based on the training module and the plurality of training modules. The system may receive second user interaction data associated with the user, and may determine an efficacy level of the training plan based on the second user interaction data. The system may dynamically update the training plan based on the efficacy level, and may dynamically display the training plan in the user profile.

18 Claims, 5 Drawing Sheets

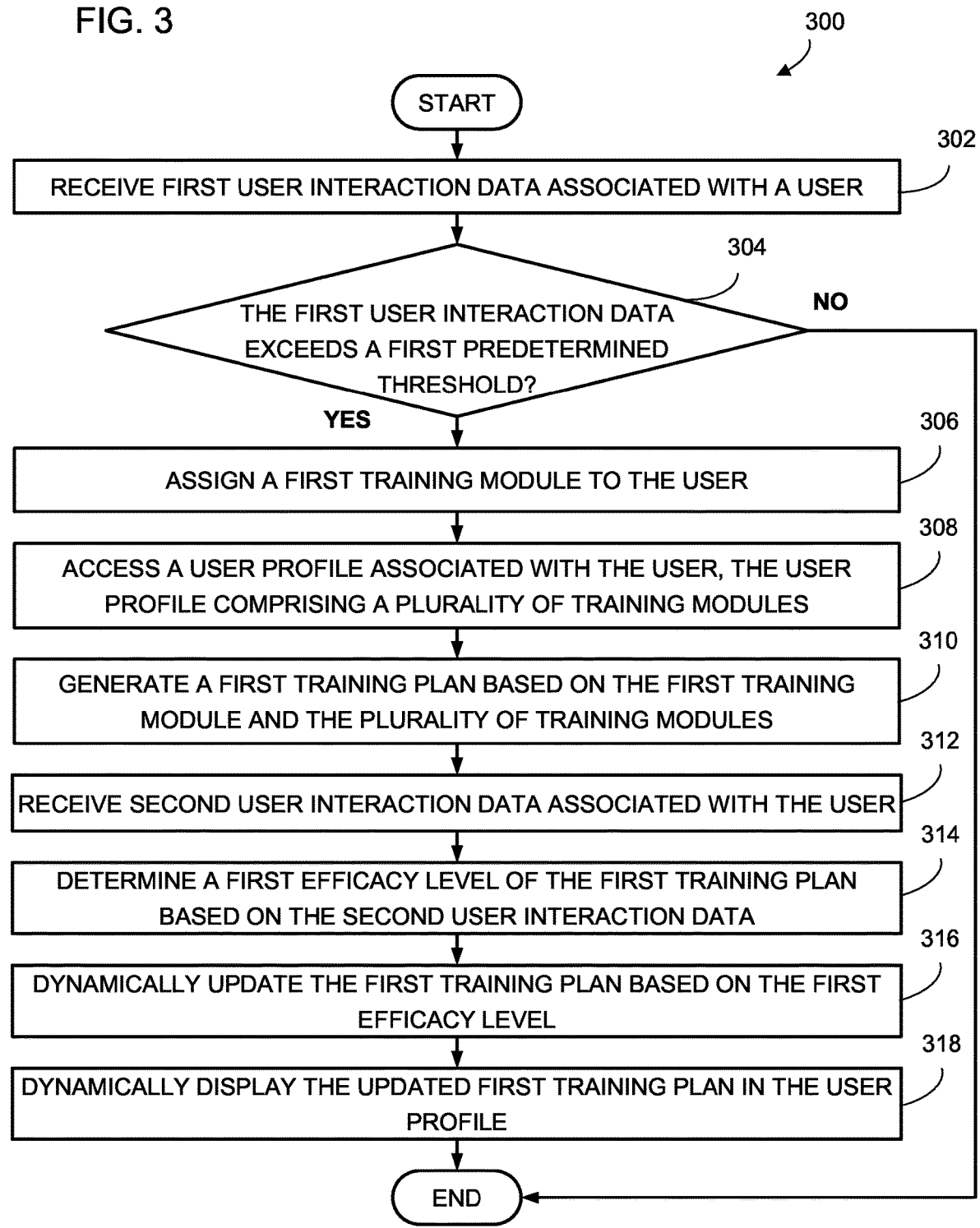

START

302

RECEIVE FIRST USER INTERACTION DATA ASSOCIATED WITH A USER

304

THE FIRST USER INTERACTION DATA EXCEEDS A FIRST PREDETERMINED THRESHOLD?    NO

YES

306

ASSIGN A FIRST TRAINING MODULE TO THE USER

308

ACCESS A USER PROFILE ASSOCIATED WITH THE USER, THE USER PROFILE COMPRISING A PLURALITY OF TRAINING MODULES

310

GENERATE A FIRST TRAINING PLAN BASED ON THE FIRST TRAINING MODULE AND THE PLURALITY OF TRAINING MODULES

312

RECEIVE SECOND USER INTERACTION DATA ASSOCIATED WITH THE USER

314

DETERMINE A FIRST EFFICACY LEVEL OF THE FIRST TRAINING PLAN BASED ON THE SECOND USER INTERACTION DATA

316

DYNAMICALLY UPDATE THE FIRST TRAINING PLAN BASED ON THE FIRST EFFICACY LEVEL

318

DYNAMICALLY DISPLAY THE UPDATED FIRST TRAINING PLAN IN THE USER PROFILE

END

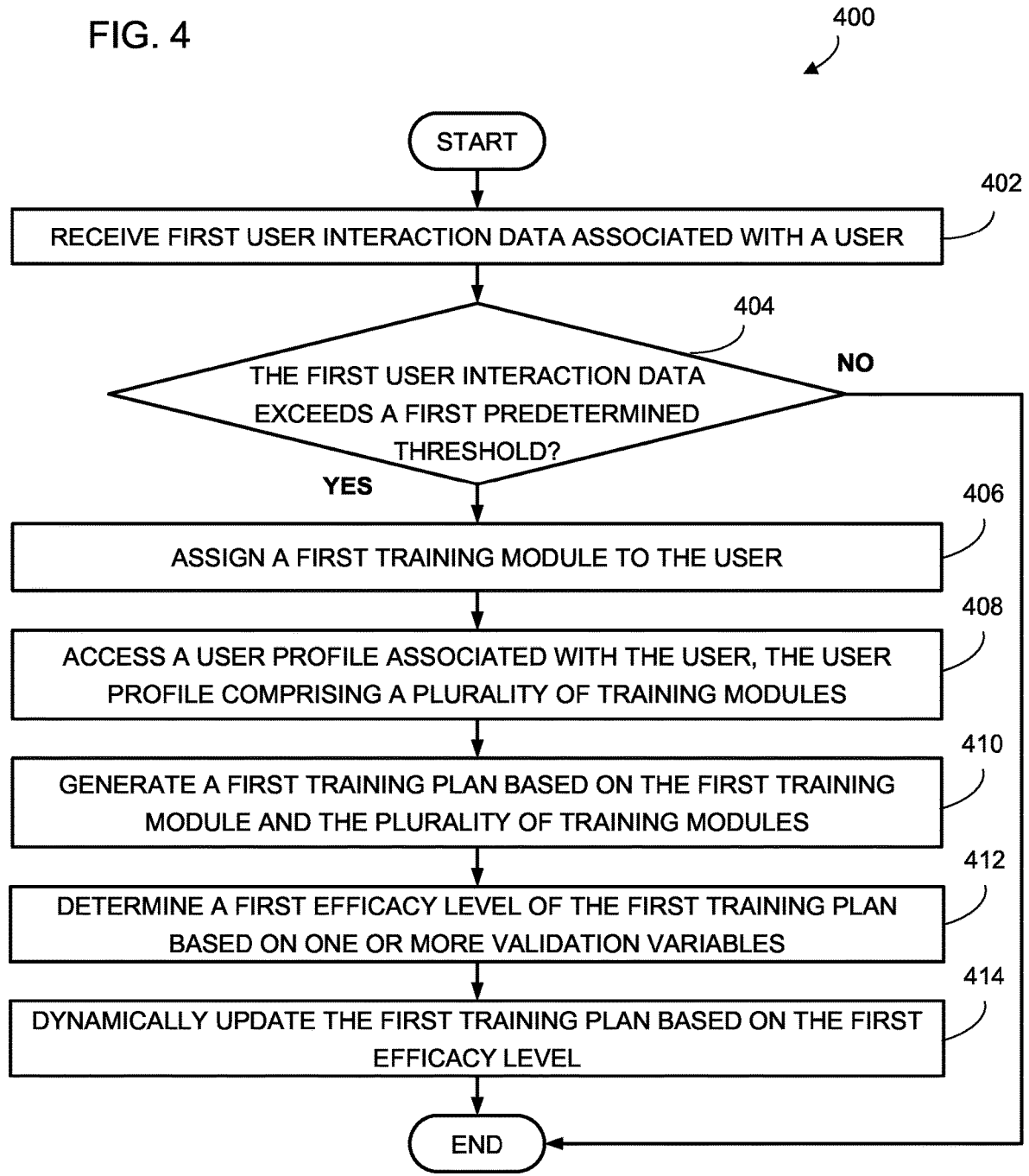

START

402
RECEIVE FIRST USER INTERACTION DATA ASSOCIATED WITH A USER

404
THE FIRST USER INTERACTION DATA EXCEEDS A FIRST PREDETERMINED THRESHOLD?

NO

YES

406
ASSIGN A FIRST TRAINING MODULE TO THE USER

408
ACCESS A USER PROFILE ASSOCIATED WITH THE USER, THE USER PROFILE COMPRISING A PLURALITY OF TRAINING MODULES

410
GENERATE A FIRST TRAINING PLAN BASED ON THE FIRST TRAINING MODULE AND THE PLURALITY OF TRAINING MODULES

412
DETERMINE A FIRST EFFICACY LEVEL OF THE FIRST TRAINING PLAN BASED ON ONE OR MORE VALIDATION VARIABLES

414
DYNAMICALLY UPDATE THE FIRST TRAINING PLAN BASED ON THE FIRST EFFICACY LEVEL

END

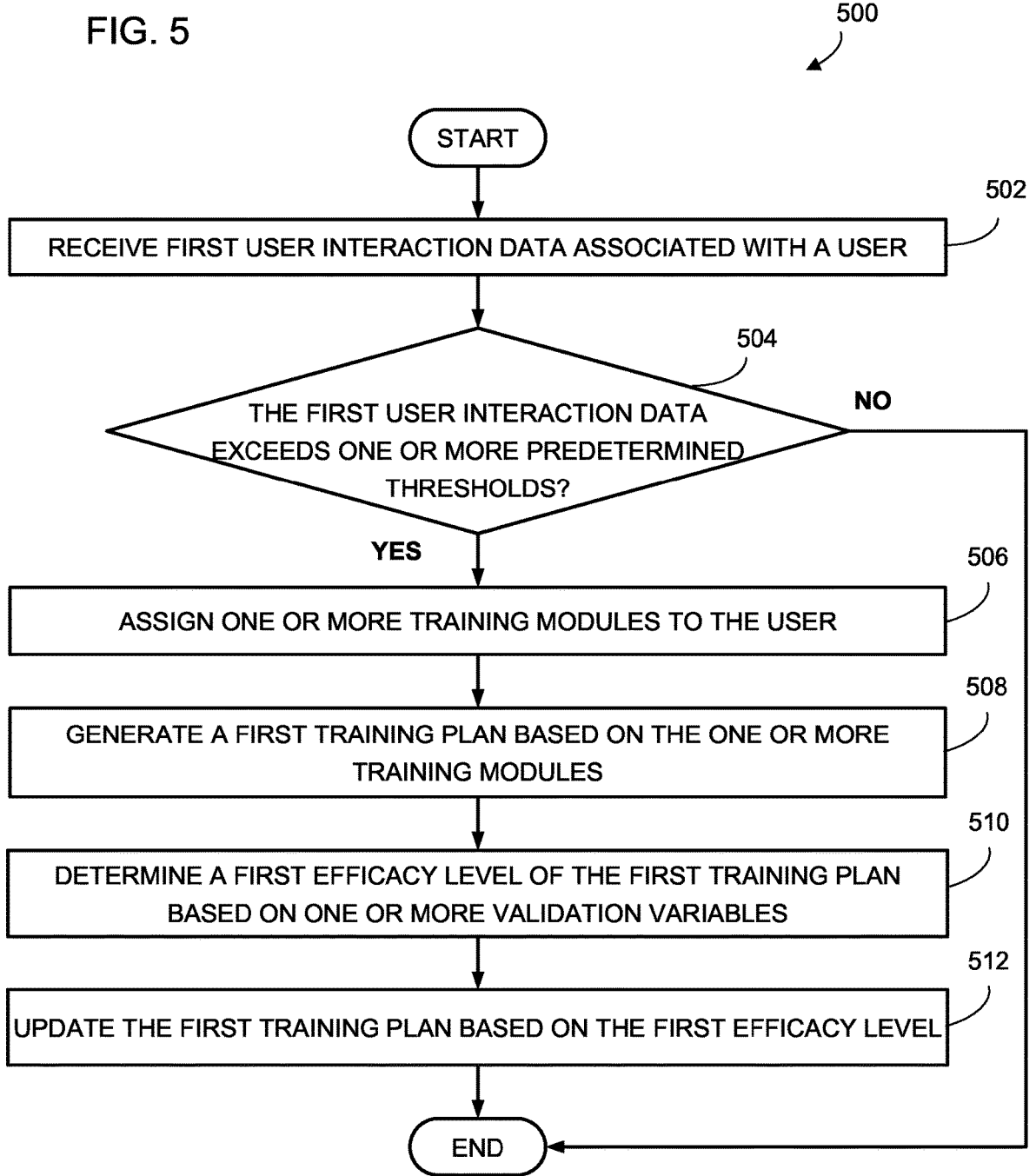

START

502
RECEIVE FIRST USER INTERACTION DATA ASSOCIATED WITH A USER

504
THE FIRST USER INTERACTION DATA EXCEEDS ONE OR MORE PREDETERMINED THRESHOLDS?

NO

YES

506
ASSIGN ONE OR MORE TRAINING MODULES TO THE USER

508
GENERATE A FIRST TRAINING PLAN BASED ON THE ONE OR MORE TRAINING MODULES

510
DETERMINE A FIRST EFFICACY LEVEL OF THE FIRST TRAINING PLAN BASED ON ONE OR MORE VALIDATION VARIABLES

512
UPDATE THE FIRST TRAINING PLAN BASED ON THE FIRST EFFICACY LEVEL

END

SYSTEMS AND METHODS FOR GENERATING CUSTOMIZED TRAINING

The disclosed technology relates to systems and methods for generating customized training, and in particular, for dynamically generating and validating customized training based on user deficiencies.

BACKGROUND

Traditional systems and methods for generating user training require manual interaction to piece together training courses based on underlying programs and platforms, such as those used in business-to-business (B2B) or business-to-customers (B2C) systems. These systems and methods, however, typically create "one size fits all" training courses that do not take into account user deficiencies and/or how those deficiencies might change over time. Further, these systems and methods require manual interaction as the underlying programs and platforms change in order to ensure training courses remain up to date.

Accordingly, there is a need for improved systems and methods for generating customized training. Embodiments of the present disclosure are directed to this and other considerations.

SUMMARY

Disclosed embodiments may include a system for generating customized training. The system may include one or more processors, and memory in communication with the one or more processors and storing instructions that, when executed by the one or more processors, are configured to cause the system to perform a method for dynamically generating customized training based on user deficiencies. The system may receive first user interaction data (e.g., number of errors received by the user, number of cursor clicks, time spent on a task, etc.) associated with a user. The system may determine, using a first machine learning model (MLM), whether the first user interaction data exceeds a first predetermined threshold, such as the user taking more than a predetermined amount of time to complete a particular task. Responsive to determining the first user interaction data exceeds the first predetermined threshold, the system may assign a first training module to the user. The system may access a user profile associated with the user (e.g., a user profile associated with an organization), the user profile comprising a plurality of training modules (e.g., required or annual training modules). The system may generate a first training plan based on the first training module and the plurality of training modules. The system may receive second user interaction data associated with the user. The system may determine a first efficacy level of the first training plan based on the second user interaction data. The system may dynamically update the first training plan based on the first efficacy level. The system may dynamically display the updated first training plan in the user profile.

In another embodiment, the system may include one or more processors, and memory in communication with the one or more processors and storing instructions that, when executed by the one or more processors, are configured to cause the system to perform a method for dynamically generating customized training based on user deficiencies. The system may receive first user interaction data associated with a user. The system may determine, using a first MLM, whether the first user interaction data exceeds a first predetermined threshold. Responsive to determining the first user interaction data exceeds the first predetermined threshold, the system may assign a first training module to the user. The system may access a user profile associated with the user, the user profile comprising a plurality of training modules. The system may generate a first training plan based on the first training module and the plurality of training modules. The system may determine a first efficacy level of the first training plan based on one or more validation variables (e.g., an amount of time for the user to complete the first training plan, user feedback, number of errors received by the user, etc.). The system may dynamically update the first training plan based on the first efficacy level.

In another embodiment, the system may include one or more processors, and memory in communication with the one or more processors and storing instructions that, when executed by the one or more processors, are configured to cause the system to perform a method for dynamically generating customized training based on user deficiencies. The system may receive first user interaction data associated with a user. The system may determine, using a first MLM, whether the first user interaction data exceeds one or more predetermined thresholds. Responsive to determining the first user interaction data exceeds the one or more predetermined thresholds, the system may assign one or more training modules to the user. The system may generate a first training plan based on the one or more training modules. The system may determine a first efficacy level of the first training plan based on one or more validation variables. The system may update the first training plan based on the first efficacy level.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 3 is a flow diagram illustrating an exemplary method for generating customized training, in accordance with certain embodiments of the disclosed technology.

FIG. 4 is a flow diagram illustrating an exemplary method for generating customized training, in accordance with certain embodiments of the disclosed technology.

FIG. 5 is a flow diagram illustrating an exemplary method for generating customized training, in accordance with certain embodiments of the disclosed technology.

DETAILED DESCRIPTION

Examples of the present disclosure relate to systems and methods for generating customized training. In particular, the disclosed technology relates to systems and methods for receiving user interaction data, assigning a training module to a user based on determining that the user interaction data exceeds a predetermined threshold, generating a training plan for the user based on the assigned training module and other training modules within the user's profile, determining an efficacy level of the training plan based on new user interaction data and/or one or more acquired variables, and dynamically updating and displaying the training plan based on the determined efficacy level. The systems and methods described herein are necessarily rooted in computer and technology as they utilize MLMs to dynamically generate and validate customized user training plans based on evolving user deficiencies. Machine learning models are a unique computer technology that involves training the models to complete tasks, such as labeling, categorizing, identifying, or determining whether user interaction data is indicative of user deficiencies with respect to systems and underlying programs so the MLMs learn how to label, categorize, identify, or determine whether incorporating one or more training modules into a training plan may be effective in addressing such user deficiencies. Importantly, examples of the present disclosure improve the speed with which computers can perform these automated tasks, by reducing the amount of data necessary to properly train the MLMs to make such determinations.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
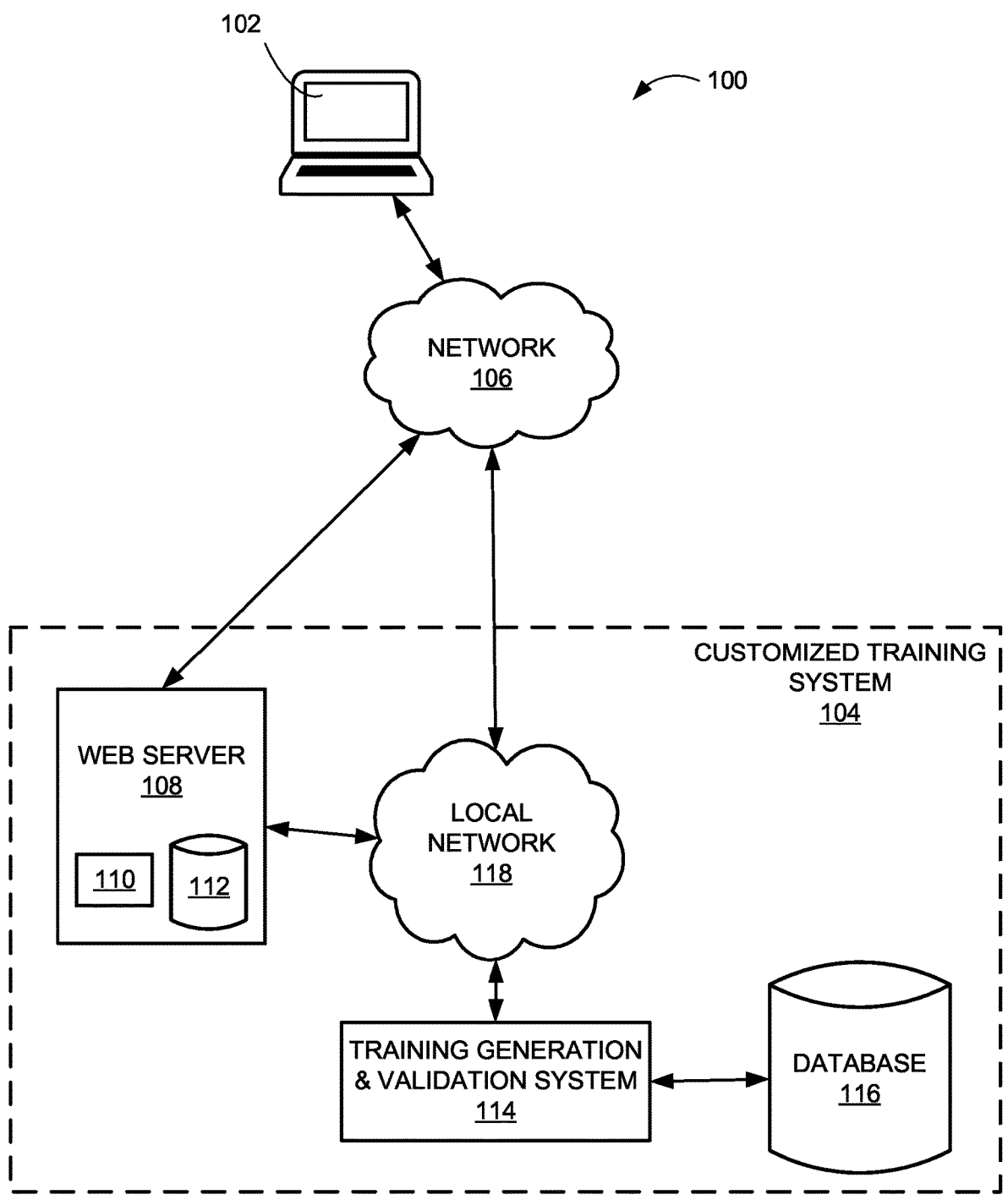
FIG. 1 is a block diagram of an example system that may be used to generate customized training, according to an example implementation of the disclosed technology.

FIG. 1 is a block diagram of an example system that may be used to generate customized training, according to an example implementation of the disclosed technology. The components and arrangements shown in FIG. 1 are not intended to limit the disclosed embodiments as the components used to implement the disclosed processes and features may vary. As shown, a user device 102 may communicate with a customized training system 104 via a network 106. In certain example implementations, the customized training system 104 may include a web server 108, a training generation and validation system 114, a database 116, and a local network 118.

In some embodiments, a user may operate the user device 102. The user device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of the customized training system 104. In some embodiments, the user device 102 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the customized training system 104. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, universal serial bus (USB), wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may include any type of computer networking arrangement used to exchange data. For example, network 106 may be the Internet, a private data network, virtual private network using a public network, and/or other suitable connection(s) that enable(s) components in the system 100 environment to send and receive information between the components of system 100. Network 106 may also include a public switched telephone network ("PSTN") and/or a wireless network.

Customized training system 104 may be associated with and optionally controlled by one or more entities such as a business, corporation, individual, partnership, or any other entity that provides one or more of goods, services, and consultations to individuals such as customers. In some embodiments, customized training system 104 may be controlled by a third party on behalf of another business, corporation, individual, or partnership. Customized training system 104 may include one or more servers and computer systems for performing one or more functions associated with products and/or services that the organization provides.

Web server 108 may include a computer system configured to generate and provide one or more websites accessible to customers, as well as any other individuals involved in accessing system 100's normal operations. Web server 108 may include a computer system configured to receive communications from user device 102 via for example, a mobile application, a chat program, an instant messaging program, a voice-to-text program, an SMS message, email, or any other type or format of written or electronic communication. Web server 108 may have one or more processors 110 and one or more web server databases 112, which may be any suitable repository of website data. Information stored in web server 108 may be accessed (e.g., retrieved, updated, and added to) via local network 118 and/or network 106 by one or more devices or systems (e.g., training generation and validation system 114) of system 100. In some embodiments, web server 108 may host websites or applications that may be accessed by user device 102. For example, web server 108 may host a financial service provider website that a user device may access by providing an attempted login that is authenticated by training generation and validation system 114. According to some embodiments, web server 108 may include software tools, similar to those described with respect to user device 102 above, that may allow web server 108 to obtain network identification data from user device 102.

Local network 118 may include any type of computer networking arrangement used to exchange data in a localized area, such as WiFi, Bluetooth™ Ethernet, and other suitable network connections that enable components of customized training system 104 to interact with one another and to connect to network 106 for interacting with components in the system 100 environment. In some embodiments, local network 118 may include an interface for communicating with or linking to network 106. In other embodiments, certain components of customized training system 104 may communicate via network 106, without a separate local network 118.

In accordance with certain example implementations of the disclosed technology, customized training system 104 may include one or more computer systems configured to compile data from a plurality of sources, for example, training generation and validation system 114, web server 108, and/or database 116. Training generation and validation system 114 may correlate compiled data, analyze the compiled data, arrange the compiled data, generate derived data based on the compiled data, and store the compiled and derived data in a database such as database 116. According to some embodiments, database 116 may be a database associated with an organization and/or a related entity that stores a variety of information relating to customers, transactions, trainings, and business operations. Database 116 may also serve as a back-up storage device and may contain data and information that is also stored on, for example, database 250, as discussed below with reference to FIG. 2.

Although the preceding description describes various functions of a web server 108, a training generation and validation system 114, and a database 116, in some embodiments, some or all of these functions may be carried out by a single computing device or a plurality of computing devices in a (cloud) serverless system.

Figure 2:
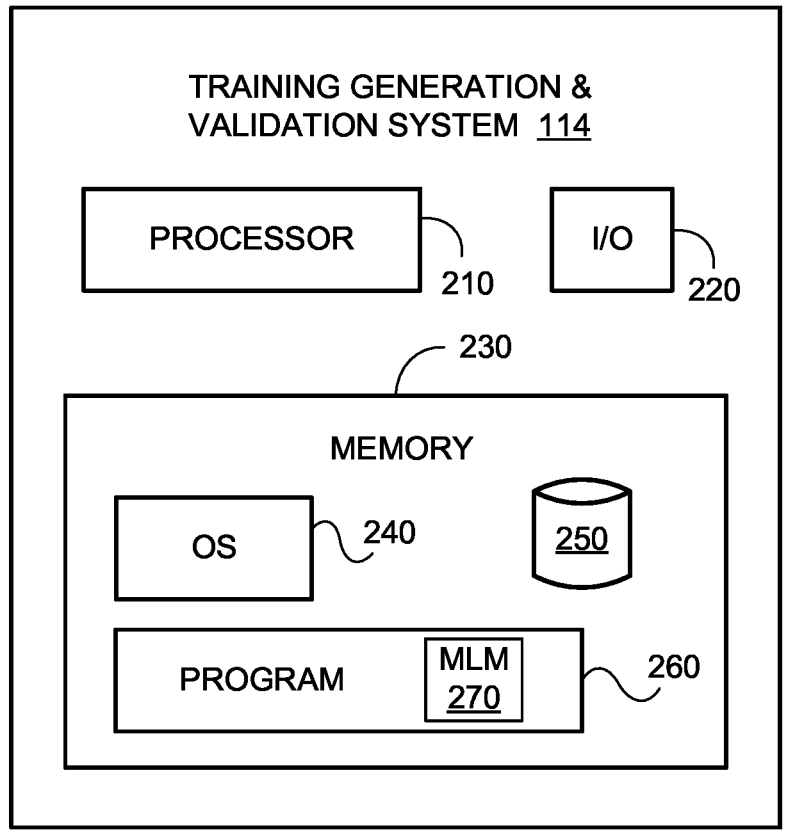
FIG. 2 is a block diagram of an example training generation and validation system used to dynamically generate and update customized training, according to an example implementation of the disclosed technology.

An example embodiment of training generation and validation system 114 is shown in more detail in FIG. 2. According to some embodiments, user device 102 and web server 108, as depicted in FIG. 1 and described above, may have a similar structure and components that are similar to those described with respect to training generation and validation system 114 shown in FIG. 2. As shown, training generation and validation system 114 may include a processor 210, an input/output ("I/O") device 220, a memory 230 containing an operating system ("OS") 240, a database 250, and a program 260. In some embodiments, program 260 may include an MLM 270 that may be trained, for example, to dynamically generate and update a customized training plan for a user, as further discussed below. In certain implementations, MLM 270 may issue commands in response to processing an event, in accordance with a model that may be continuously or intermittently updated. Moreover, processor 210 may execute one or more programs (such as via a rules-based platform or the trained MLM 270), that, when executed, perform functions related to disclosed embodiments.

In certain example implementations, training generation and validation system 114 may be a single server or may be configured as a distributed computer system including multiple servers or computers that interoperate to perform one or more of the processes and functionalities associated with the disclosed embodiments. In some embodiments, training generation and validation system 114 may be one or more servers from a serverless or scaling server system. In some embodiments, training generation and validation system 114 may further include a peripheral interface, a transceiver, a mobile network interface in communication with processor 210, a bus configured to facilitate communication between the various components of training generation and validation system 114, and a power source configured to power one or more components of training generation and validation system 114.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a USB port, a micro-USB port, a high-definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: RFID, NFC, Bluetooth™, BLE, WiFi™, ZigBee™, ABC protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within memory 230.

Processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. Processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, processor 210 may be a single core processor that is configured with virtual processing technologies. In certain embodiments, processor 210 may use logical processors to simultaneously execute and control multiple processes. Processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, training generation and validation system 114 may include one or more storage devices configured to store information used by processor 210 (or other components) to perform certain functions related to the disclosed embodiments. In one example, training generation and validation system 114 may include memory 230 that includes instructions to enable processor 210 to execute one or more applications, such as server applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, training generation and validation system 114 may include a memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, training generation and validation system 114 may include memory 230 that may include one or more programs 260 to perform one or more functions of the disclosed embodiments. For example, in some embodiments, training generation and validation system 114 may additionally manage dialogue and/or other interactions with the customer via a program 260.

Processor 210 may execute one or more programs located remotely from training generation and validation system 114. For example, training generation and validation system 114 may access one or more remote programs that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include database 250 for storing related data to enable training generation and validation system 114 to perform one or more of the processes and functionalities associated with the disclosed embodiments.

Training generation and validation system 114 may also be communicatively connected to one or more memory devices (e.g., databases) locally or through a network. The remote memory devices may be configured to store information and may be accessed and/or managed by training generation and validation system 114. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Training generation and validation system 114 may also include one or more I/O devices 220 that may comprise one or more interfaces for receiving signals or input from devices and providing signals or output to one or more devices that allow data to be received and/or transmitted by training generation and validation system 114. For example, training generation and validation system 114 may include interface components, which may provide interfaces to one or more input devices, such as one or more keyboards, mouse devices, touch screens, track pads, trackballs, scroll wheels, digital cameras, microphones, sensors, and the like, that enable training generation and validation system 114 to receive data from a user (such as, for example, via user device 102).

In example embodiments of the disclosed technology, training generation and validation system 114 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While training generation and validation system 114 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of training generation and validation system 114 may include a greater or lesser number of components than those illustrated.

FIG. 3 provides a flow diagram illustrating an exemplary method 300 for generating customized training, in accordance with certain embodiments of the disclosed technology. Method 300 may be performed by one or more components of system 100 (e.g., web server 108 or training generation and validation system 114 of customized training system 104, or user device 102), as described above with respect to FIGS. 1 and 2.

In block 302 of FIG. 3, the system (e.g., via customized training system 104) may receive first user interaction data associated with a user. User interaction data may comprise information associated with a user's actions within a target system, such as a B2B or B2C platform. For example, user interaction data may include application programming interface (API) calls, error logs, notification logs, or user interface interaction data such as degree of cursor movement, number and/or type of search queries, time spent performing a task, number of cursor clicks, location of cursor clicks, and the like. In some embodiments, as part of receiving the first user interaction data, the system may standardize the data based on, for example, attributes, meta data, configuration, state, and/or settings related to any discovered usage patterns. In some embodiments, the system may store the first user interaction data, based on the standardization, in an intermediate representation (IR) for use in further processing and optimization of user profiles and/or future user interaction data, as discussed further below.

In decision block 304, the system (e.g., via customized training system 104) may determine, using a first MLM, whether the first user interaction data exceeds a first predetermined threshold. That is, each type of user interaction data may include a respective predetermined threshold, above which a user may be deemed deficient in a particular capability with respect to the applicable program, as further described below. For example, one type of user interaction data may comprise the time spent performing a task, such as searching for an address in a location tracking program (e.g., Google Maps™). The respective predetermined threshold may be, for example, three minutes. The system may thus use a trained MLM, such as a neural network (NN), to recognize when the user has been searching for a particular address for longer than three minutes. The MLM may be trained by providing the MLM with a training data that includes one or more labels corresponding to the one or more types of user interaction data and their respective thresholds. Based on the training data, the MLM may classify unlabeled data sets such as each newly collected type of user interaction data.

In block 306, responsive to determining the first user interaction data exceeds the first predetermined threshold, the system (e.g., via customized training system 104) may assign a first training module to the user. As described above, the system may deem a user deficient in a given capability within a program if the system determines user interaction data exceeds a predetermined threshold. The system may thus assign a training module relevant to the identified deficiency to the user such that the user may improve on that specific capability.

In block 308, the system (e.g., via customized training system 104) may access a user profile associated with the user, the user profile comprising a plurality of training modules. That is, a user may already have an established user profile comprising a variety of training modules previously assigned to the user. For example, an organization, such as the user's employer, may have previously assigned training modules to the user based on industry-specific or location-specific requirements. Industry-specific trainings may be, for example, company-specific or market-specific. Location-specific trainings may be, for example, based on regulatory requirements in certain countries (e.g., required annual trainings) and/or cultural expectations (e.g., incorporating diversity, cultural, or religious themes).

In block 310, the system (e.g., via training generation and validation system 114) may generate a first training plan based on the first training module and the plurality of training modules. That is, the system may be configured to—based on the identified deficiencies of the user at a given time—create a customized training plan for the user based on the first training module and the plurality of training modules already in the user's profile, as discussed above. The system may be configured to generate this customized plan based on one or more generation variables. These variables may comprise whether a training module is required or optional (e.g., a company may require its employees to complete certain annual trainings), whether the user previously completed a training module, a length of time the user has been in a role (e.g., the longer an employee has worked in a given role, the less introductory-type trainings he or she may be required to take), whether a training module may be overridden, the user's expertise or experience (e.g., a company may interview a new employee and/or review his or her resume to determine what trainings would be necessary or relevant), user demographics, and the like.

Each of the one or more generation variables may be assigned a respective weight, for example, ranging from 0 to 1, or from 0% to 100%. For example, a required training module, or a training module that may not be overridden, may be assigned a weight of 100%. On the other hand, a training module assigned to an employee with many years of experience in a given field, may be assigned as an optional training module weighted at 60%. In some embodiments, the system may use the same trained MLM as outlined above with respect to block 304, or may use a different MLM, to generate the customized training plan based on the weights assigned to each training module. The MLM, for example a NN, may be trained to enter each assigned weight into a cost function to determine the most optimal combination of training modules for a user.

In some embodiments, the respective weights may be assigned to each of the generation variables by an operating entity, such as a company using customized trainings for its employees. In other embodiments, the utilized MLM may itself dynamically assign respective weights based on its own learning of a user's deficiencies and/or improvements over time with respect to various capabilities.

In some embodiments, once the system has generated a customized training plan, the system may display the training plan in a user's profile and/or upload the training plan to a Learning Management System (LMS) such that the user may access and complete the training plan.

In block 312, the system (e.g., via customized training system 104) may receive second user interaction data associated with the user. Second user interaction data may comprise the same or similar information as included in first user interaction data, as outlined above with respect to block 302. However, while the system may utilize first user interaction data for determining which training modules should be assigned to a user, and how to best customize a training plan for the user, the system may receive second user interaction data after the user has completed his or her customized training plan (or at least some portion thereof) such that the system may identify how the user's capabilities in certain programs have changed (e.g., improved or digressed) since starting or completing the training plan.

In block 314, the system (e.g., via customized training system 104) may determine a first efficacy level of the first training plan based on the second user interaction data. That is, the system may determine how effective the customized training plan was for a user based on how that user's capabilities changed since starting or completing the training program. In some embodiments, the system may be configured to compare equivalent types of user interaction data between the first user interaction data (i.e., pre-training) and second user interaction data (i.e., post-training) to see how the two equivalent types of data compare to one another as well as to their respective predetermined threshold. For example, the system may compare the number of errors received by the user when conducting a specific task within a program both pre-training and post-training, and compare each to the applicable predetermined threshold.

In block 316, the system (e.g., via training generation and validation system 114) may dynamically update the first training plan based on the first efficacy level. That is, as the system (e.g., via an MLM) monitors user performance, deficiencies, and/or improvements over time with respect to various capabilities within programs, the system may continuously modify a user's customized training plan by, for example, assigning new training modules to the user, eliminating or modifying the content of training modules already assigned to the user, or modifying the assigned weights of the generation and/or validation variables, as discussed above. In some embodiments, dynamically updating the first training plan may be further based on user completion of the training plan. For example, the MLM may be trained to update the training plan after the user has completed a certain amount (e.g., percentage) of the training plan, a certain number of all training modules within the training plan, the entire training plan, etc.

In block 318, the system (e.g., via training generation and validation system 114) may dynamically display the updated first training plan in the user profile. As described above, the system may be configured to display each generated training plan in a user's profile (or an LMS system) such that the user may access and complete the training plan. As the system dynamically updates a given training plan, as discussed above with respect to block 316, the system may also dynamically display the updated training plan in the user profile (or LMS system). In some embodiments, the system may be configured to continuously display an updated training plan, such that any time a user logs into his or her user profile, for example, the user may access the most recently updated training plan. In other embodiments, the system may be configured to display the updated training plan on a periodic basis, for example, every 12 hours. In such case, the user may be notified (e.g., via email) each time a training plan within the user's profile has been updated or modified.

Method 400 of FIG. 4 is similar to method 300 of FIG. 3, except that method 400 determines the efficacy of the training plan based on one or more validation variables as opposed to second user interaction data. The descriptions of blocks 402, 404, 406, 408, 410, and 414 may be the same as or similar to the respective descriptions of blocks 302, 304, 306, 308, 310, and 316 of method 300 and as such, are not repeated herein for brevity.

In block 412, the system (e.g., via customized training system 104) may determine a first efficacy level of the first training plan based on one or more validation variables. These variables may comprise a Customer Satisfaction (CSAT) (e.g., a survey requesting the user indicate a satisfaction level for the training plan on a scale of 1 to 5), user feedback (e.g., a user may indicate he or she would like to learn further about a certain topic), user surveys, user training flow, and/or user effectiveness, such as, how long it takes the user to complete the training plan or complete a task within a program (e.g., create a new account, find what he or she needs from a search, etc.), conversion metrics (e.g., whether the user makes it through the entire training plan without quitting), number of errors received by the user (e.g., taken from error logs), and the like. In some embodiments, the system may determine the first efficacy level of the first training plan based on both these validation variables and the second user interaction data, as discussed above.

Each of the one or more validation variables may be assigned a respective weight, as described above with respect to the one or more generation variables in block 310. The system may similarly use an MLM, such as a NN, trained to enter each assigned weight into a cost function to determine the efficacy of the first training plan. Weights may be assigned based on how important a certain validation variable is deemed to be with respect to efficacy. For example, a user effectiveness variable, such as the number of errors received by the user, may be assigned a weight of 95%, while a user survey (e.g., requesting the user indicate how helpful he or she thought the training was on a scale of 1 to 10) may be assigned a weight of 45%.

As discussed above with respect to block 310, weights may be assigned to each of the validation variables by an operating entity, such as a company using customized trainings for its employees. Alternatively, the utilized MLM may itself dynamically assign respective weights based on its own learning of a user's deficiencies and/or improvements over time with respect to various capabilities.

Method 500 of FIG. 5 is also similar to method 300 of FIG. 3, except that method 500 does not include accessing a user profile, as included in method 300, and determines the efficacy of the training plan based on one or more validation variables as opposed to second user interaction data, as in method 400. The descriptions of blocks 502, 504, 506, and 512 may be the same as or similar to the respective descriptions of blocks 302, 304, 306, and 316 of method 300 and as such, are not repeated herein for brevity.

In block 508, the system (e.g., via training generation and validation system 114) may generate a first training plan based on the one or more training modules. As method 500 of FIG. 5 does not include accessing a user profile (comprising a plurality of training modules already assigned to the user), the system may be configured to generate a customized training plan based only on one or more training modules assigned to a user, as outlined above with respect to block 306 of FIG. 3. That is, the system may deem a user deficient in one or more different capabilities within a program if the system determines one or more types of first user interaction data exceed their respective predetermined thresholds. The system may thus assign one or more training modules relevant to the identified deficiencies to the user such that the user may improve on each specific capability.

In block 510, the system (e.g., via customized training system 104) may determine a first efficacy level of the first training plan based on one or more validation variables. This step may be the same as or similar to the description of block 412 as discussed above with respect to method 400.

EXAMPLE USE CASE

The following example use case describes an example of a typical user flow pattern. This section is intended solely for explanatory purposes and not in limitation.

In one example, a user may access Google Maps™ for purposes of searching for and analyzing a variety of geographic locations and addresses. An organization, such as the user's employer, may be able to track the user's interactions with the Google Maps™ program, such as the number of cursor clicks and/or search queries the user conducts before landing on the correct address, the amount of time required for the user to search for a specific location, the user's ability to place markers or tags on points within a map, etc. While Google Maps™ itself may have its own built-in trainings for the public's use, the organization may be able to supplement the built-in trainings with training modules customized to the user's individualized deficiencies within the Google Maps™ program. The organization may track the user's interactions with Google Maps™ such that it can create a customized training plan for the user. The organization may rely on an MLM, specifically a NN, to collect and organize each of the received user interactions. The NN may be configured to compare each of the received user interactions to a respective predetermined threshold, such as a maximum number of errors received by the user. If the NN determines a user interaction, such as number of errors received by the user over a period of time, exceeds its respective predetermined threshold, such as five errors over a period of one hour, the system may assign a specific training module to the user to help the user reduce errors while using the Google Maps™ program.

The system may also access the user's profile, such as a profile internal to the organization, to identify any training modules already assigned to the user (e.g., annual required trainings). Based on the assigned training module and the already-assigned training modules, the system, using an MLM, may assemble a customized training plan for the user. Based on how the user's capabilities and deficiencies have changed over time, the MLM may assign a weight (from 0% to 100%) to each of the individual training modules, depending on certain variables, such as the user's experience level or time spent in a certain role within the organization. The MLM may then assemble the individual training modules into a customized training plan based on the assigned weights. The system may then upload the generated plan into an LMS such that the user may access and complete the plan.

Once the user has completed one or more modules from the customized training plan, the system, once again using an MLM, may validate or determine the efficacy of that training plan or the one or more modules from the customized training plan for the user, based on future or later-received user interaction data. Collecting future user interaction data, again within the Google Maps™ program, may help the MLM to determine how effective the training was for improving the user's past identified deficiencies within the program. Additionally, the system may also validate or determine the efficacy of the training plan based on certain variables, such as user feedback and user effectiveness (e.g., how long it now takes the user, post-training, to complete certain tasks within Google Maps™ compared to pre-training).

As the system continues to monitor the user's capabilities, deficiencies, and improvements in Google Maps™ over time, the system, using an MLM, may dynamically update the user's customized training plan by switching up which training modules are included in the plan, or modifying the content of the training modules already included in the plan. With this approach, the user's training plan may continuously be updated to reflect the user's real-time capabilities. The system may also dynamically display the dynamically updated training plan, in the user's internal organization profile and an LMS, such that each time the user logs into an account to complete training, the user is presented with a training plan that aligns closely with the user's current program capabilities.

In some examples, disclosed systems or methods may involve one or more of the following clauses:

Clause 1: A system comprising: one or more processors; and a memory in communication with the one or more processors and storing instructions that, when executed by the one or more processors, are configured to cause the system to: receive first user interaction data associated with a user; determine, using a first machine learning model (MLM), whether the first user interaction data exceeds a first predetermined threshold; responsive to determining the first user interaction data exceeds the first predetermined threshold, assign a first training module to the user; access a user profile associated with the user, the user profile comprising a plurality of training modules; generate a first training plan based on the first training module and the plurality of training modules; receive second user interaction data associated with the user; determine a first efficacy level of the first training plan based on the second user interaction data; dynamically update the first training plan based on the first efficacy level; and dynamically display the updated first training plan in the user profile.

Clause 2: The system of clause 1, wherein the first user interaction data and the second user interaction data comprise one or more of number of errors received by the user, degree of cursor movement, number of cursor clicks, time spent on a task, or combinations thereof.

Clause 3: The system of clause 1, wherein the first MLM comprises a neural network.

Clause 4: The system of clause 1, wherein generating the first training plan is performed by a second MLM.

Clause 5: The system of clause 1, wherein generating the first training plan is further based on one or more generation variables comprising one or more of whether a training module is required or optional, whether the user previously completed a training module, a length of time the user has been in a role, whether a training module may be overridden, user expertise, user experience, user demographics, or combinations thereof.

Clause 6: The system of clause 1, wherein determining the first efficacy level of the first training plan is further based on one or more validation variables.

Clause 7: The system of clause 6, wherein the one or more validation variables comprise one or more of a Customer Satisfaction (CSAT), an amount of time to complete the first training plan, user feedback, user surveys, user training flow, number of errors received by the user, or combinations thereof.

Clause 8: The system of clause 1, wherein dynamically updating the first training plan is further based on user completion of the first training plan.

Clause 9: A system comprising: one or more processors; and a memory in communication with the one or more processors and storing instructions that, when executed by the one or more processors, are configured to cause the system to: receive first user interaction data associated with a user; determine, using a first machine learning model (MLM), whether the first user interaction data exceeds a first predetermined threshold; responsive to determining the first user interaction data exceeds the first predetermined threshold, assign a first training module to the user; access a user profile associated with the user, the user profile comprising a plurality of training modules; generate a first training plan based on the first training module and the plurality of training modules; determine a first efficacy level of the first training plan based on one or more validation variables; and dynamically update the first training plan based on the first efficacy level.

Clause 10: The system of clause 9, wherein the first user interaction data comprises one or more of number of errors received by the user, degree of cursor movement, number of cursor clicks, time spent on a task, or combinations thereof.

Clause 11: The system of clause 9, wherein generating the first training plan is performed by a second MLM and is further based on one or more generation variables.

Clause 12: The system of clause 11, wherein the one or more generation variables comprise one or more of whether a training module is required or optional, whether the user previously completed a training module, a length of time the user has been in a role, whether a training module may be overridden, user expertise, user experience, user demographics, or combinations thereof.

Clause 13: The system of clause 9, wherein the one or more validation variables comprise one or more of a Customer Satisfaction (CSAT), an amount of time to complete the first training plan, user feedback, user surveys, user training flow, number of errors received by the user, or combinations thereof.

Clause 14: The system of clause 9, wherein the instructions are further configured to cause the system to: receive second user interaction data associated with the user.

Clause 15: The system of clause 14, wherein determining the first efficacy level of the first training plan is further based on the second user interaction data.

Clause 16: A system comprising: one or more processors; and a memory in communication with the one or more processors and storing instructions that, when executed by the one or more processors, are configured to cause the system to: receive first user interaction data associated with a user; determine, using a first machine learning model (MLM), whether the first user interaction data exceeds one or more predetermined thresholds; responsive to determining the first user interaction data exceeds the one or more predetermined thresholds, assign one or more training modules to the user; generate a first training plan based on the one or more training modules; determine a first efficacy level of the first training plan based on one or more validation variables; and update the first training plan based on the first efficacy level.

Clause 17: The system of clause 16, wherein generating the first training plan is further based on one or more generation variables.

Clause 18: The system of clause 17, wherein the one or more generation variables comprise one or more of whether a training module is required or optional, whether the user previously completed a training module, a length of time the user has been in a role, whether a training module may be overridden, user expertise, user experience, user demographics, or combinations thereof.

Clause 19: The system of clause 16, wherein the one or more validation variables comprise one or more of a Customer Satisfaction (CSAT), an amount of time to complete the first training plan, user feedback, user surveys, user training flow, number of errors received by the user, or combinations thereof.

Clause 20: The system of clause 16, wherein the instructions are further configured to cause the system to: receive second user interaction data associated with the user, wherein determining the first efficacy level of the first training plan is further based on the second user interaction data.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A system comprising:
   one or more processors; and a memory in communication with the one or more processors and storing instructions that, when executed by the one or more processors, are configured to cause the system to:

receive first user interaction data associated with a user;

determine, using a first machine learning model (MLM), whether the first user interaction data exceeds a first predetermined threshold;

responsive to determining the first user interaction data exceeds the first predetermined threshold, assign a first training module to the user;

access a user profile associated with the user, the user profile comprising a plurality of training modules;

generate, using a second MLM, a first training plan based on the first training module and the plurality of training modules by:

assigning a first weight to each of one or more generation variables, and determining a first order of the plurality of training modules based on the first weight of each of the one or more generation variables;

receive second user interaction data associated with the user;

determine a first efficacy level of the first training plan based on the second user interaction data and one or more validation variables;

dynamically update the first training plan using the second MLM based on the first efficacy level by:

assigning a second weight to each of the one or more validation variables, and determining an updated first order of the plurality of training modules based on the second weight of each of the one or more validation variables; and dynamically display in real-time the updated first training plan in the user profile with the updated first order comprising at least one of:

assigning one or more new training modules to the user, eliminating one or more of the plurality of training modules, or modifying content of one or more of the plurality of training modules.

2. The system of claim 1, wherein the first user interaction data and the second user interaction data comprise one or more of number of errors received by the user, degree of cursor movement, number of cursor clicks, time spent on a task, or combinations thereof.

3. The system of claim 1, wherein:

the first MLM comprises a neural network, the first order is determined using a first cost function, and the first efficacy level of the first training plan is determined using a second cost function.

4. The system of claim 1, wherein the instructions are further configured to cause the system to:

train the first MLM using one or more labels corresponding to one or more types of user interaction training data and indicating corresponding training thresholds, wherein the first MLM determines whether the first user interaction data exceeds the first predetermined threshold by:

classifying at least a portion of the first user interaction data as a first type of one or more types, determining the first predetermined threshold associated with the first type, and determining whether the portion of the first user interaction data exceeds the first predetermined threshold.

5. The system of claim 1, wherein the one or more generation variables comprising one or more of whether a training module is required or optional, whether the user previously completed a training module, a length of time the user has been in a role, whether a training module may be overridden, user expertise, user experience, user demographics, or combinations thereof.

6. The system of claim 1, wherein determining the updated order of the plurality of training modules comprises modifying one or more of the first weight and the second weight.

7. The system of claim 1, wherein the one or more validation variables comprise one or more of a Customer Satisfaction (CSAT), an amount of time to complete the first training plan, user feedback, user surveys, user training flow, number of errors received by the user, or combinations thereof.

8. The system of claim 1, wherein dynamically updating the first training plan is further based on user completion of the first training plan.

9. A system comprising:

one or more processors; and a memory in communication with the one or more processors and storing instructions that, when executed by the one or more processors, are configured to cause the system to:

receive first user interaction data associated with a user;

determine, using a first machine learning model (MLM), whether the first user interaction data exceeds a first predetermined threshold;

responsive to determining the first user interaction data exceeds the first predetermined threshold, assign a first training module to the user;

access a user profile associated with the user, the user profile comprising a plurality of training modules;

generate, using a second MLM, a first training plan based on the first training module and the plurality of training modules by:

assigning a first weight to each of one or more generation variables, and determining a first order of the plurality of training modules based on the first weight of each of the one or more generation variables;

determine a first efficacy level of the first training plan based on one or more validation variables;

dynamically update the first training plan using the second MLM based on the first efficacy level by:

assigning a second weight to each of the one or more validation variables, and determining an updated first order of the plurality of training modules based on the second weight of each of the one or more validation variables; and update the user profile in real time to display the updated training plan with the updated first order by at least one of:

assigning one or more new training modules to the user, eliminating one or more of the plurality of training modules, or modifying content of one or more of the plurality of training modules.

10. The system of claim 9, wherein the first user interaction data comprises one or more of number of errors received by the user, degree of cursor movement, number of cursor clicks, time spent on a task, or combinations thereof.

11. The system of claim 9, wherein the one or more generation variables comprise one or more of whether a training module is required or optional, whether the user previously completed a training module, a length of time the user has been in a role, whether a training module may be overridden, user expertise, user experience, user demographics, or combinations thereof.

12. The system of claim 9, wherein the one or more validation variables comprise one or more of a Customer Satisfaction (CSAT), an amount of time to complete the first training plan, user feedback, user surveys, user training flow, number of errors received by the user, or combinations thereof.

13. The system of claim 9, wherein the instructions are further configured to cause the system to:
receive second user interaction data associated with the user.

14. The system of claim 13, wherein determining the first efficacy level of the first training plan is further based on the second user interaction data.

15. A system comprising:
one or more processors; and
a memory in communication with the one or more processors and storing instructions that, when executed by the one or more processors, are configured to cause the system to:
receive first user interaction data associated with a user;
determine, using a first machine learning model (MLM), whether the first user interaction data exceeds one or more predetermined thresholds;
responsive to determining the first user interaction data exceeds the one or more predetermined thresholds, assign one or more training modules to the user;
generate, using a second MLM, a first training plan based on the one or more training modules by:
assigning a first weight to each of one or more generation variables, and determining a first order of the one or more of training modules based on the first weight of each of the one or more generation variables;
determine a first efficacy level of the first training plan based on one or more validation variables;
update the first training plan using the second MLM based on the first efficacy level by:
assigning a second weight to each of the one or more validation variables, and
determining an updated first order of the one or more of training modules based on the second weight of each of one or more validation variables; and
display in real-time the updated first training plan with the updated first order by at least one of:
assigning one or more new training modules to the user,
eliminating one or more of the training modules, or
modifying content of one or more of the training modules.

16. The system of claim 15, wherein the one or more generation variables comprise one or more of whether a training module is required or optional, whether the user previously completed a training module, a length of time the user has been in a role, whether a training module may be overridden, user expertise, user experience, user demographics, or combinations thereof.

17. The system of claim 15, wherein the one or more validation variables comprise one or more of a Customer Satisfaction (CSAT), an amount of time to complete the first training plan, user feedback, user surveys, user training flow, number of errors received by the user, or combinations thereof.

18. The system of claim 15, wherein the instructions are further configured to cause the system to:
receive second user interaction data associated with the user,
wherein determining the first efficacy level of the first training plan is further based on the second user interaction data.

* * * * *